Dec. 16, 1969
R. B. HODGDON, JR
3,484,293
CATION EXCHANGE FUEL CELLS
Filed April 4, 1967
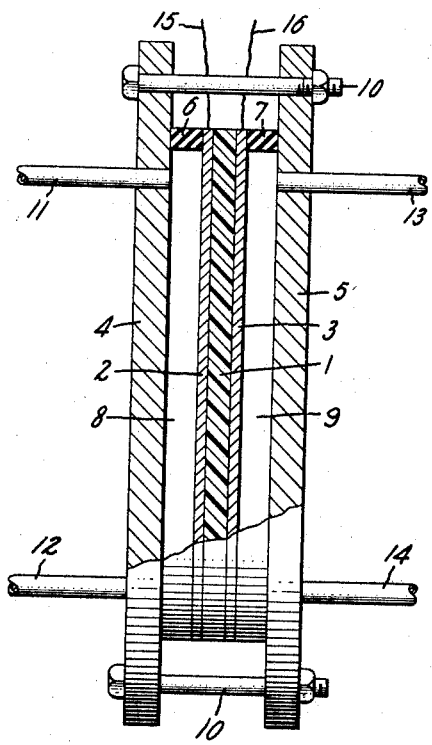
Inventor:
Russell B. Hodgdon, Jr.
by Carl O. Thomas
His Attorney.

3,484,293
CATION EXCHANGE FUEL CELLS
Russell B. Hodgdon, Jr., South Hamilton, Mass., assignor to General Electric Company, a corporation of New York
Filed Apr. 4, 1967, Ser. No. 628,409
Int. Cl. H01m 27/16; C08g 43/00; B01j 1/08
U.S. Cl. 136—86                           10 Claims

ABSTRACT OF THE DISCLOSURE

The invention is directed to a fuel cell incorporating an ion exchange structure formed of a sulfonated polyphenylene ether having aryl groups directly attached to the backbone phenyl groups. The ion exchange structure is maintained flexible even under drying conditions by the incorporation of a plasticizer, namely an alkaryl ether of polyalkylene glycol.

---

My invention is directed to fuel cells incorporating an electrolyte ion exchange structures formed of sulfonated poly-aryl phenylene ethers. My invention is also directed to a novel ion exchange structure and a plasticizer therefor.

The use of continuous ion exchange structures, such as membranes, tubes, etc., in electrodialysis and fuel cells is by now well understood by those skilled in the art. The application of ion exchange structures to such cells, particularly fuel cells, has emphasized the desirability of obtaining ion exchange materials exhibiting high resistance to oxidative and hydrolytic breakdown as well as a high level of physical integrity and dimensional stability. Although not essential, it is desirable that the ion exchange structures possess considerable resilience. This facilitates handling and mounting in cell fixtures. Further, in the case of a fuel cell where two different gas streams are separated by the ion exchange structure acting as a barrier, the structure should preferably be capable of reliably withstanding fluctuating pressure differentials over a prolonged period.

My invention is directed to a fuel cell incorporating an ion exchange structure of improved resiliency. In one aspect my ion exchange structure is comprised of an ion exchange polymer consisting essentially of a sulfonated polyphenylene ether having appending aryl groups directly attached to backbone phenyl groups and having an intrinsic viscosity prior to sulfonation of at least 0.3 dl./g. as measured in chloroform at 25° C. A water insoluble plasticizer is dispersed in the ion exchange polymer consisting essentially of aralkyl ethers of alkylene glycol. The plasticizer is present in the proportion of from 0.1 to 1 part per part, by weight, of the ion exchanger polymer. Water is present in the ion exchange structure in an amount ranging from 15 to 80 percent by weight based on the combined weight of the ion exchange structure. The ion exchange structure exhibits an ion exchange capacity in the range of from 1.00 to 2.50 meq. $H^+$ per gram of polyphenylene ether.

My invention may be better understood by reference to the following detailed description considered in conjunction with the drawing, which is an elevation, partly in section, of a fuel cell.

As a starting material for the practice of my invention I employ any polyphenylene ether having appending aryl groups directly attached to backbone phenyl groups. Such polyphenylene ethers are by now well understood in the art. For example, Allan S. Hay in commonly assigned Patent No. 3,306,875 issued Feb. 28, 1967 and incorporated by reference as part of this application, discloses a process of forming novel polyphenylene ethers through the polymerization of 2,6-disubstituted phenols. I prefer to employ poly-(2,6-diaryl-1,4-phenylene ethers) in which one of the appending aryl groups is phenyl and the other appending aryl group is selected from the group consisting of phenyl, phenyl having 1 to 5 $CS_{1-8}$ alkyl substituents, biphenylyl, terphenylyl and naphthyl. Such polyphenylene ethers as well as an improved process for their manufacture is disclosed by Hay in commonly assigned patent application Ser. No. 593,733, filed Nov. 14, 1966, the disclosure of which is also incorporated by reference.

I prefer to employ those polyphenylene ethers having an intrinsic viscosity of at least 0.3 deciliters per gram when measured in chloroform at 25° C. Intrinsic viscosity is, of course, measured prior to sulfonation, since the polymers in their sulfonated form are not soluble in chloroform. All subsequent references to intrinsic viscosity assume, for the sake of brevity, such measurement conditions. The maximum intrinsic viscosity is not critical. Polymers exhibiting intrinsic viscosities as high as 1.2 dl./g., for example, differ only slightly in physical properties from polymers having intrinsic viscosities of 0.7 dl./g. Intrinsic viscosity is commonly relied upon as an indirect measure of molecular weight, since it is recognized that a direct relationship exists between intrinsic viscosity and molecular weight for polymers of comparable linearity. Polyphenylene ethers having intrinsic viscosities above 0.3 dl./g. measured in chloroform at 25° C. are in all instances, even when subsequently sulfonated to the maximum degree contemplated, sufficiently structurally stable and water insoluble to have utility in fabricating ion exchange structures.

The polyphenylene ether having appending aryl directly attached to backbone phenyl groups is preferably converted to an ion exchange polymer by selectively sulfonating the appending aryl groups. Such ion exchange polymers as well as a process for their preparation is fully disclosed by Hodgdon et al. in commonly assigned patent application Ser. No. 628,411, filed Apr. 4, 1967, and entitled Improvements Relating to Cation Exchange Fuel Cells. The disclosure of this patent application is incorporated by reference in my present disclosure.

As a first step for such selective sulfonation, the polyphenylene ether is dissolved in a liquid halogenated hydrocarbon. The chlorinated lower alkyl hydrocarbons are generally preferred. Analogs thereof incorporating the other halogens are equally operative, although somewhat more expensive. The proportion of polymer to solvent is not critical. On a weight basis it is generally preferred to employ from 20 to 100 parts solvent per part polymer. Chloroform, ethylene dichloride, tetrachloroethane, and carbon tetrachloride are exemplary of preferred, low cost, readily available solvents.

The next step of the selective sulfonation process is undertaken to increase the relative liability of hydrogen attached to the appending aryl groups. In its initial form the hydrogen attached to the backbone phenyl groups of the polyphenylene ether are relatively more labile than the hydrogen attached to the appending aryl. This relationship is revered so that appending aryl hydrogen become the most displaced component of the ether. To accomplish this backbone phenyl hydrogen are displaced with a substituent such as halogen or nitro groups.

Halogenation is accomplished, for example, merely by intimately contacting the halogen with the dissolved polymer. Bromination is preferably accomplished by refluxing bromine and the dissolved polymer at a temperature in the range of from 25 to 60° C. Because of its higher chemical reactivity, it is preferred to chlorinate using chlorine gas at temperatures from 0 to 25° C. Iodine substitution is best accomplished by mixing chloroiodide with the dissolved polymer at temperatures in the range of from 28 to 90° C. Fluorination may be accomplished by first brominating and the displacing the bromine with fluorine through reaction of the brominated polymer with potassium fluoride at 100° C. Nitro groups may be incorporated at the dropwise addition of fuming nitric acid to the dissolved polymer. Other techniques for halogenating or nitrating are, of course, known to the art and readily employable.

It is preferred to employ an excess of halogen so that as an average value, at least 1.5 halogen are incorporated per repeating polymer unit. When the backbone hydrogen are displaced with nitro groups, which are meta directing, it is unnecessary to displace more than one hydrogen per backbone phenyl group, since the presence of one nitro group per backbone phenyl ring will deactivate the entire backbone phenyl ring. While the above backbone phenyl substituents are preferably incorporated in the final ion exchange polymer simply as a matter of convenience, it is appreciated that these substituents may be removed from the polymer by any desired conventional technique once sulfonation has been accomplished.

Formation of the preferred, selectively sulfonated ion exchange polymers, as disclosed by Hodgdon et al., is completed by sulfonation. This may be accomplished by introducing a conventional sulfonating agent, such as sulfur trioxide chlorosulfonic acid, oleum, concentrated sulfuric acid, etc., into a solvent not attacked by the sulfonating agent, preferably the halohydrocarbon previously employed as a solvent in substituting with halogen or nitro groups, in which the polymer is dispersed. Upon selective sulfonation, the ion exchange polymer will precipitate from the liquid halogenated hydrocarbon previously used as a solvent. Recovery of the ion exchange polymer formed and its fabrication into an ion exchange structure can then be performed accordingly to techniques well known in the art.

While I prefer to employ as ion exchange polymers those formed by the selective sulfonation process described above, since sulfonic acid groups are entirely confined to the appending aryl and are, accordingly, very resistant to cleavage under the operating conditions encountered in fuel cells, it is recognized that other sulfonated polyphenyl ethers having appending aryl groups directly attached to the backbone phenyl groups are known in the art and have been fabricated into ion exchange structures. These may be alternatively used in the practice of my invention.

For example, Fox et al. in Patent No. 3,259,592, commonly assigned, disclose a cation exchange resin having a repeating structural unit of the formula:

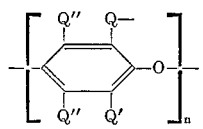

wherein the oxygen atom of one unit is connected to the benzene nucleus of the adjoining unit. The character $n$ stands for a positive integer and is at least 100. Q is a monovalent substituent selected from the group consisting of hydrogen, aliphatic hydrocarbon radicals free of a tertiary alpha-carbon atom, and aliphatic halohydrocarbon radicals having at least two carbon atoms and being free of a tertiary alpha-carbon atom. Q' is a monovalent substituent which is the same as Q and in addition may be halogen, arylhydrocarbon radicals, haloarylhydrocarbon radicals, hydrocarbonoxy radicals having at least two carbon atoms and being free of an aliphatic tertiary alpha-carbon atom, and halohydrocarbonoxy radicals having at least two carbon atoms and being free of an aliphatic tertiary alpha-carbon atom. Q'' may be the same as Q' and in addition —$SO_3H$. There is at least one sufonate group in each repeating unit of the polymer. This patent is, by reference, made part of this disclosure.

It is preferred to employ those ion exchange polymers having an ion exchange capacity in the range of from 1.00 to 2.50. The term "ion exchange capacity" is quantitatively defined by the formula $IEC_A = H+/A$
$IEC_A$ = The ion exchange capacity
$H+$ = The milliequivalents of hydrogen ions present, and
$A$ = The weight of dry polyphenylene ether in grams (no water included)

The ion exchange capacity of any given polymer may be controlled merely by controlling the proportion of sulfonating agent used in its preparation. It is recognized, of course, that ion exchange structures of lower ion exchange capacity could be employed, if desired, although at the price of a proportionate loss in effectiveness. With ion exchange capacities above 2.50 the polymers tend to ingest large quantities of water and are accordingly dimensionally unstable, although still useful as ion exchange materials.

It is a specific feature of my invention to improve the resilience of ion exchange structures comprised of sulfonated polyphenylene ether polymers having directly attached appending aryl by blending with the polymer a plasticizer. Ion exchange structures formed of unplasticized sulfonated polyphenylene ether polymers are sufficiently resilient for use in fuel cells, electrodialysis cells, etc. so long as they retain the desired moisture content (discussed more fully below). If, however, the conventional ion exhange structure or any portion thereof becomes inadvertently dried out in manufacture, assembly, or use, a brittle structure will result which will readily fracture. This feature of conventional structures understandably restricts the range of uses to which they may be put, since it is not possible to completely eliminate drying as a factor in many environments.

It is my discovery that the addition of a water insoluble alkaryl ether of polyalkylene glycol when blended with sulfonated polyphenylene ethers having aryl directly attached to the backbone phenyl groups in a proportion of from 0.1 to 1 (preferably 0.15 to 0.60) part per part, by weight, of the ion exchange polymer will produce an ion exchange structure which remains resilient even when dried. Preferred polyalkylene glycol ethers are those having a molecular weight in the range of from 200 to 10,000. It is immaterial whether the ether is a dialkaryl ether, a monoalkaryl ether, or a mixture of both. Preferred polyalkylene glycols are comprised of ethylene, n-propylene, and isopropylene groups as well as mixtures thereof. The polyalkylene glycols preferably range from 2 to 100 repeating units. A preferred class of alkarylus are those chosen from the group consisting of phenyl, biphenylyl, terphenylyl and naphthyl each having 1 to 5 $C_{5-25}$ alkyl substituents. A suitable commercially available material of the type generically designated above is Tergitol NP-14, which is a water insoluble nonyl-phenyl ether of polyethylene glycol, sold by Union Carbide Company.

The plasticizer may be blended into the ion exchange polymer using any conventional technique. When the ion exchange polymer is intended to be solvent cast to form an ion exchange structure, it is preferred to choose a solvent such as alcohol, ketone, etc., which is a mutual solvent for both the polymer and plasticizer and to blend the materials prior to casting. When the ion exchange polymer is intended to be formed by pressing, calendering, or a like technique, however, it may be desirable to knead the plasticizer into the polymer prior to final shaping.

The sulfonated polyphenylene ethers formed according to my invention possess sufficient structural integrity and low cost to be suitable for forming ion exchange structures including no other solid component. It is recognized nevertheless that techniques have been previously developed in the art for improving the strength of ion exchange structures formed of lower strength and less dimensionally stable ion exchange polymers, which may be used, if desired. For example, screens, cloth, fibers, and other conventional reinforcing materials may be optionally embedded in ion exchange structures formed according to my invention. It is also recognized as a conventional alternative to stretch more expensive ion exchange polymers with less costly non-ion exchange polymers or inorganic fillers.

It is noted that the incorporation of structural reinforcing materials and/or extenders will function to dilute the ion exchange polymer and reduce the equivalent ion exchange capacity of the resulting ion exchange structure. The term "equivalent ion exchange capacity" is defined quantitatively by the formula $$IEC_{AB} = IEC_A + \frac{A}{A+B}$$

where $IEC_{AB}$ = The equivalent ion exchange capacity
$IEC_A$ = The ion exchange capacity of the ion exchange polymer
$A$ = The weight in grams of dry ion exchange polymer (no water included)
$B$ = The weight in grams of the solid inert ingredient (no water included)

When the ion exchange polymer accounts for the entire weight of the dry structure, the equivalent ion exchange capacity corresponds to that of the ion exchange polymer. It is preferred that ion exchange structures formed according to my invention exhibit an equivalent ion exchange capacity in the range of from 1.00 to 2.50. As indicated quantitatively above, the ion exchange capacity of the sulfonated polymer and proportion of added materials may be readily adjusted to maintain the desired equivalent ion exchange capacity. The incorporation of structural reinforcing materials may, of course, permit the use of somewhat more highly sulfonated ion exchange polymers than could be otherwise employed.

In order to impart mobility to the hydrogen ions and, hence, ionic conductivity to the ion exchange structure, it is necessary that the structure include not only ion exchange polymer but also water. The water content is expressed in weight percent according to the following formula $$HOH = \frac{W}{W+A+B} \times 100$$

where

HOH = Water content in percent, by weight
W = Weight of water present in grams
A = Weight in grams of dry ion exchange polymer
B = Weight in grams of solid inert ingredients, if any The water content may range from as low as 15 percent up to 80 percent, by weight. The water content does not include supernatant water but only the water remaining after the ion exchange structure appears dry and feels dry to the touch. The water may be incorporated in the ion exchange structure at any time prior to use. When the solvent casting technique for forming the ion exchange structures is employed, the ion exchange structures are brought into contact with water immediately after formation.

The ion exchange structures formed according to my invention may be used in electrodialysis and fuel cells. The ion exchange structures, preferably in the form of ion exchange membranes, are particularly advantageous in fuel cell applications, since they retain their resilience even when inadvertently dehydrated, as by operation with a low humidity fuel or oxidant or when operated at high temperature or current levels. Further, the edge portions of the membrane which may be exposed to the atmosphere and hence dried during extended fuel cell use are protected from fracture. While particular emphasis is given to fuel cell use, it is recognized that my plasticized ion exchange structures may be put to a variety of alternative and less stringent applications. For example, ion exchange structures formed according to our invention may be employed in electrodialysis cells (note Juda et al. Re. Patent 24,865), oxidizable or reducible gas concentration cells (note Maget commonly assigned application Ser. No. 385,925, filed July 29, 1964), regenerative fuel cells (note White et al. commonly assigned application Ser. No. 509,823, filed Nov. 26, 1965), oxidizable or reducible gas sensor cells (note Warner commonly assigned Patent No. 3,149,921), etc. It is appreciated that such cells, although applied to dissimilar functions, may bear structural identity with fuel cells. Accordingly, the term "fuel cell" is merely intended to designate the preferred application of a cell structure.

When the membranes formed according to my invention are mounted in a fuel cell, they are used in combination with an anode and a cathode, as is well understood in the art. Grubb Patent 2,913,511, Niedrach Patent 3,134,697, and Maget Patent 3,274,031, each of which are commonly assigned, are illustrative of conventional fuel cell electrodes which may be conveniently employed. We prefer to use electrodes of the type disclosed by Niedrach in commonly assigned Patent No. 3,297,484 and Niedrach et al. in commonly assigned patent application, Ser. No. 232,689, filed Oct. 24, 1962, both of which are incorporated by reference into this disclosure.

A specific fuel cell configuration is shown in the drawing. An ion exchange membrane 1 formed according to our invention is mounted between electrodes 2 and 3. The membrane and electrodes together form a membrane-electrode assembly. Fixtures 4 and 5, separated from electrodes 2 and 3, respectively, by insulating shims 6 and 7 form reactant chambers 8 and 9 adjacent the electrodes. The fixtures, shims and membrane-electrode assembly are held together by tie bolt assemblies 10. Conduits 11 and 12 in fixtures 4 and conduits 13 and 14 in fixtures 5 allow ingress and egress of fluent reactants and products to and from the fuel cell. Electrical energy may be removed from the fuel cell through electrical leads 15 and 16 attached to electrodes 2 and 3, respectively.

The following examples are for purposes of illustration and are not intended to limit the invention.

EXAMPLE 1

An 18.5 gram sample of sulfonated poly (2,6-diphenyl-3,5-dibromo-1,4-phenyl ether) having an intrinsic viscosity of 0.71 deciliters per gram measured in chloroform at 25° C. and an ion exchange capacity of 1.60 meq. H ions per gram of dry resin was dissolved by shaking overnight in 100 grams of methyl alcohol. To this 2.8 grams of nonyl phenyl ether of polyethylene glycol sold commercially under the trademark "Tergitol-NP 14" was added by mixing. This amounted to 0.15 part plasticizer per part ion exchange polymer on a weight basis. The resulting solution was then cast onto a flat surface, and the methyl alcohol was allowed to evaporate slowly by placing over the surface of the cast material a glass tray. The smooth, dry film formed was stripped from the table and placed in distilled water. A small portion of the film was ion exchanged to the potassium ion form, and the transverse resistivity measured with a General Radio resistance bridge at 1 kc. was found to be 100.1 ohm-cm.—that is, well suited for fuel cell use. The water content of this film was found to be 33.2 percent by weight based upon the total film weight. The thickness of the film was noted to be 0.0215 cm. The film remained flexible when relieved of supernatant water, and further remained flexible when a portion of the water held by secondary van der Waals forces—that is, the water that remains after the film looks dry and feels dry to the touch—was removed. The flexibility of the film in the dried condition was noted to be in marked contrast to the brittle and readily frangible properties of comparable films lacking plasticizer.

EXAMPLE 2

The procedure of Example 1 was repeated, except that 0.20 part plasticizer per part ion exchange on a weight basis was employed. The transverse resistivity in the potassium ion form was found to be 94.8 ohm-cm. The water content of the film was found to be 35.9 percent by weight based on the total weight of the film. The thickness of the cast membrane was found to be 0.0280 cm. The film displayed the same general flexibility as the film prepared by the preceding example, although to a slightly greater degree.

EXAMPLE 3

The procedure of Example 1 was repeated, except that 0.60 part plasticizer per part ion exchange polymer on a weight basis was employed. In the potassium ion exchanged form the film exhibited a transverse resistivity of 105 ohm-cm., still well suited for fuel cell use. The water content of the film was found to be 79.2 percent by weight based upon the total weight of the film. The thickness of the cast film was found to be 0.032 cm. When dried of supernatant water the film was quite flexible and was also noted to be elastomeric. Upon removing a portion of the water held by secondary van der Waals forces, the flexible and elastomeric properties of the film persisted.

EXAMPLE 4

It was attempted to repeat the procedure of Example 1 substituting for the nonyl phenyl polyethylene glycol materials such as polyethylene glycol di-2-ethyl hexoate (sold commercially under the trademark "Flexol 4GO"), triethylene glycol di-2-ethyl hexoate (sold commercially under the trademark "Flexol 3GO"), triethylene glycol di-2-ethyl butyrate (sold commercially under the trademark "Flexol 3GH"), tri-2-ethyl-hexyl phosphate (sold commercially under the trademark "Flexol TOF"), chlorinated polyphenyls (sold commercially under the trademarks "Arochlor" 1221, 1260, and 5442), mixed cresyl diphenyl phosphate (sold commercially under the trademark "Santicizer" 140), and alkyl aryl phosphates (sold commercially under the trademark "Santicizer" 141).

Each attempt was unsuccessful, since it was impossible to uniformly disperse the would-be plasticizer in the polymer. In each case the materials appeared incompatible and could not be blended.

EXAMPLE 5

A 3.5" by 7.5" rectangular section of the film formed in Example 2 was cut for mounting in a fuel cell similar to that shown in the drawing. Two electrodes formed according to the teaching of copending, commonly assigned patent application Ser. No. 232,689, filed Oct. 24, 1962, which is incorporated into this specification by reference, were united to the membrane section by pressing at 12,000 p.s.i. at 225° F. in a flat bed press. The electrodes each contained a platinum loading of 35 mg./cm.$^2$. The electrodes were formed of a paste of 85 weight percent platinum and 15 weight percent polytetrafluoroethylene binder. The platinum used exhibited a surface area of approximately 30 square meters per gram. The polytetrafluoroethylene wet-proofing coating employed on the gas side of each electrode was present in the amount of 1.6 mg./cm.$^2$. Woven 45 mesh platinum screens were incorporated in the electrodes as current collectors. The active area of the electrodes was 2" by 6".

Using hydrogen as a fuel and oxygen as an oxidant, the following cell performance was obtained

| Currently density amps/sq. ft.: | Potential—volts (IR losses included) |
|---|---|
| 11.1 | 0.967 |
| 22.2 | 0.914 |
| 33.3 | 0.892 |
| 44.4 | 0.862 |
| 50.0 | 0.847 |
| 100.0 | 0.804 |

The polarization data was obtained employing an ammeter, voltmeter, and variable electrical load. The film employed as the membrane remained flexible throughout and following testing. It showed no tendency to crack or fracture, even in areas that normally tend to dry out during use, such as around the edges and in the area adjacent the reactant inlets.

While I have described and exemplified my invention with reference to certain preferred embodiments, it is appreciated that numerous variations will readily occur to those skilled in the art. It is accordingly intended that the scope of my invention be determined with reference to the following claims.

What I claim and desire to secure by Letters Patent of the United States is:

1. A resilient ion exchange structure comprised of
   an ion exchange polymer consisting essentially of a sulfonated polyphenylene ether having appending aryl groups directly attached to backbone phenyl groups and having an intrinsic viscosity prior to sulfonation of at least 0.3 dl./g. measured in chloroform at 25° C.,
   a water insoluble plasticizer dispersed in said ion exchange polymer consisting essentially of alkaryl ethers of polyalkylene glycol, said plasticizer being present in the proportion of from 0.1 to 1 part per part, by weight, of said ion exchange polymer, and
   water in an amount ranging from 15 to 80 percent by weight based on the total weight of said ion exchange structure,
   said ion exchange structure exhibiting an ion exchange capacity in the range of from 1.00 to 2.50 meq. H$^+$ per gram of said polyphenylene ether.

2. A resilient ion exchange structure as defined by claim 1 in which said alkaryl ethers of polyalkylene glycol are comprised of from 2 to 100 repeating alkylene groups per molecule and said alkylene groups are chosen from the class consisting of ethylene, isopropylene, and n-propylene.

3. A resilient ion exchange structure as defined by claim 1 in which said alkaryl ether of polyalkylene glycol is comprised of alkaryl groups chosen from the class of phenyl, biphenylyl, terphenylyl, and naphthyl, each having 1 to 5 C$_{5-25}$ alkyl substituents.

4. An ion exchange structure according to claim 1 in which said plasticizer is present in the proportion of from 0.15 to 0.60 part per part, by weight, of said ion exchange polymer.

5. An ion exchange structure according to claim 1 in which said polyphenylene ether is a 2,6-diaryl substituted 1,4-phenylene ether, one appending aryl of said ether being phenyl and the remaining appending aryl being chosen from the group consisting of phenyl, phenyl having 1 to 5 C$_{1-8}$ alkyl substituents, biphenylyl, terphenylyl, and naphthyl.

6. An ion exchange structure according to claim 1 in which said appending aryl groups of said polyphenylene ether are sulfonated and said backbone phenyl are provided with substituents chosen from the class consisting of halogen and nitro groups.

7. A fuel cell comprised of
   an ion exchange structure as defined by claim 1,
   first and second opposed electrodes in contact with said ion exchange structure, and
   means for supplying a fuel to said first electrode and an oxidant to said second electrode.

8. A fuel cell comprised of
an ion exchange structure as defined by claim 4,
first and second opposed electrodes in contact with said ion exchange structure, and
means for supplying a fuel to said first electrode and an oxidant to said second electrode.

9. A fuel cell comprised of
an ion exchange structure as defined by claim 5,
first and second opposed electrodes in contact with said ion exchange structure, and
means for supplying a fuel to said first electrode and an oxidant to said second electrode.

10. A fuel cell comprised of an ion exchange structure comprised of
an ion exchange polymer consisting essentially of a sulfonated polyphenylene ether, said ether being a 1,4-phenyl ether which is 2,6-diaryl substituted and which is provided with backbone phenyl substituents, chosen from the class consisting of halogen and nitro groups, in an amount sufficient to increase the relative lability of hydrogen attached to appending aryl, one of said appending aryl being phenyl and the remaining of said appending aryl being chosen from the group consisting of phenyl, phenyl having 1 to 5 $C_{1-8}$ alkyl substituents, biphenylyl, terphenylyl and naphthyl, said ion exchange polymer prior to sulfonation having an intrinsic viscosity of at least 0.3 dl./g. as measured in chloroform at 25° C.,
a water insoluble plasticizer dispersed in said ion exchange polymer consisting essentially of alkaryl ether of polyalkylene glycol, said plasticizer being present in the proportion of from 0.15 to 0.60 part per part, by weight, of said ion exchange polymer, said alkaryl ether being comprised of from 2 to 100 repeating alkylene groups per molecule, said alkylene groups being chosen from the class consisting of ethylene, isopropylene, and n-propylene, and said alkaryl groups being chosen from the class consisting of phenyl, biphenylyl, terphenylyl, and naphthyl, each having 1 to 5 $C_{5-25}$ alkyl substituents,
water in an amount ranging from 15 to 80 percent by weight based on the total weight of said ion exchange structure, said ion exchange structure exhibiting an ion exchange capacity in the range of from 1.00 to 2.50 meq. H per gram of said polyphenylene ether,
first and second opposed electrodes in contact with said ion exchange structure, and
means for supplying a fuel to said first electrode and and oxidant to said second electrode.

References Cited

UNITED STATES PATENTS 3,013,100   12/1961   Mendelsohn et al. ____ 136—146
3,306,875   2/1967   Hay _____ 260—2.1 XR WINSTON A. DOUGLAS, Primary Examiner DONALD L. WALTON, Assistant Examiner U.S. Cl. X.R.

136—153; 204—296; 260—2.2